(12) United States Patent
Hosoi (10) Patent No.: US 11,541,345 B2
(45) Date of Patent: Jan. 3, 2023

(54) CANISTER

(71) Applicant: FUTABA INDUSTRIAL CO., LTD., Okazaki (JP)

(72) Inventor: Masahito Hosoi, Okazaki (JP)

(73) Assignee: FUTABA INDUSTRIAL CO., LTD., Okazaki (JP)

( * ) Notice: Subject to any disclaimer, the term of this patent is extended or adjusted under 35 U.S.C. 154(b) by 0 days.

(21) Appl. No.: 17/690,165

(22) Filed: Mar. 9, 2022

(65) Prior Publication Data

US 2022/0297051 A1 Sep. 22, 2022

(30) Foreign Application Priority Data

Mar. 17, 2021 (JP) .............................. JP2021-044109

(51) Int. Cl.
*F02M 25/08* (2006.01)
*B01D 53/04* (2006.01)
*B01J 20/20* (2006.01)

(52) U.S. Cl.
CPC .......... *B01D 53/0415* (2013.01); *B01J 20/20* (2013.01); *F02M 25/0854* (2013.01); *B01D 2253/102* (2013.01); *B01D 2257/708* (2013.01); *B01D 2259/4516* (2013.01); *B01J 2220/58* (2013.01)

(58) Field of Classification Search
CPC .................................................. F02M 25/0854
See application file for complete search history.

(56) References Cited

U.S. PATENT DOCUMENTS

| 5,098,453 | A | * | 3/1992 | Turner | F02M 25/0854 55/509 |
| 5,632,808 | A | * | 5/1997 | Hara | B01D 53/0415 96/139 |
| 6,321,726 | B1 | * | 11/2001 | Khami | F02M 25/0854 55/385.3 |
| 2004/0261777 | A1 | * | 12/2004 | Ogawa | F02M 25/0854 123/698 |
| 2005/0188850 | A1 | * | 9/2005 | Allen | B01D 53/0446 96/152 |
| 2006/0065252 | A1 | * | 3/2006 | Meiller | F02M 25/0854 123/519 |

(Continued)

FOREIGN PATENT DOCUMENTS

JP H0742899 B2 5/1995

*Primary Examiner* — Sizo B Vilakazi
*Assistant Examiner* — Anthony L Bacon
(74) *Attorney, Agent, or Firm* — Withrow & Terranova, P.L.L.C.; Vincent K. Gustafson (57) ABSTRACT

A canister that adsorbs and desorbs fuel vapor generated in a fuel tank of a vehicle includes a housing and at least one expansion inhibitor. The housing is in a form of a cylinder configured to be filled with activated carbon. The housing includes a filled portion which is an area in the housing filled with the activated carbon; an unfilled portion which is an area in the housing not filled with the activated carbon; a boundary portion that defines a boundary between the filled portion and the unfilled portion; and a center portion which is situated at the axial center of the filled portion. The at least one expansion inhibitor inhibits an expansion of the boundary portion in an outward direction from being greater than an expansion of the center portion in the outward direction.

8 Claims, 5 Drawing Sheets

(56) References Cited

U.S. PATENT DOCUMENTS

| | | | |
|---|---|---|---|
| 2011/0315126 A1* | 12/2011 | Yoshida | F02M 25/0854 123/519 |
| 2012/0103309 A1* | 5/2012 | Lin | F02M 25/0854 123/519 |
| 2012/0111848 A1* | 5/2012 | Kim | B01D 53/0438 219/385 |
| 2013/0186375 A1* | 7/2013 | Hasegawa | F02M 25/06 123/519 |
| 2014/0041522 A1* | 2/2014 | Yoshida | B01D 53/04 96/122 |
| 2016/0040631 A1* | 2/2016 | Mani | F02M 25/0854 206/0.7 |
| 2019/0234347 A1* | 8/2019 | Kato | B01D 53/0407 |
| 2021/0131384 A1* | 5/2021 | Tsuboi | F02M 25/0854 |

\* cited by examiner

CANISTER

CROSS-REFERENCE TO RELATED APPLICATIONS

This application claims the benefit of Japanese Patent Application No. 2021-044109 filed on Mar. 17, 2021 with the Japan Patent Office, the entire disclosure of which is incorporated herein by reference.

BACKGROUND

The present disclosure relates to a canister.

A fuel tank of a vehicle is coupled to a canister that inhibits fuel vapor in the fuel tank from being released into the atmosphere. The canister is for causing activated carbon to adsorb the fuel vapor, as well as for carrying out purging by drawing air to cause the activated carbon to desorb the fuel vapor and supply the desorbed fuel vapor to an internal combustion chamber of an engine.

The activated carbon used in the canister is formed into pellets and granules and packed into a filling chamber of the canister. Japanese Examined Patent Application Publication No. 7-042899 discloses a fuel vapor storage canister that prevents activated carbon granules from falling out from the filling chamber by disposing an upper tray and a lower tray across a bed of activated carbon granules. More specifically, the fuel vapor storage canister is designed to have the upper tray nested within the lower tray such that a peripheral flange of the upper tray is arranged within a coaming of the lower tray to form a gap that is smaller than the activated carbon granules.

SUMMARY

The structure as disclosed in Japanese Examined Patent Application Publication No. 7-042899 may still have a risk of having the activated carbon falling out from the filling chamber. A technique to better inhibit the activated carbon from falling out from the filling chamber is required.

One aspect of the present disclosure preferably provides a new structure that inhibits activated carbon from falling out from a filling chamber.

One mode of the present disclosure is a canister that adsorbs and desorbs fuel vapor generated in a fuel tank of a vehicle. The canister includes a housing, and at least one expansion inhibitor. The housing is in a form of a cylinder configured to be filled with activated carbon. The housing includes a filled portion which is an area in the housing filled with the activated carbon; an unfilled portion which is an area in the housing not filled with the activated carbon; a boundary portion that defines a boundary between the filled portion and the unfilled portion; and a center portion which is situated at the axial center of the filled portion. The at least one expansion inhibitor is configured to inhibit an expansion of the boundary portion in an outward direction from being greater than an expansion of the center portion in the outward direction.

In such configuration, the at least one expansion inhibitor inhibits the expansion of the boundary portion in the outward direction. This consequently makes it possible to inhibit creation of a gap between components for suppressing the activated carbon, situated between the filled portion and the unfilled portion, and the boundary portion. The at least one expansion inhibitor therefore can inhibit the activated carbon from falling out from a filling chamber of the housing.

In the aforementioned canister, the at least one expansion inhibitor is formed on the housing, and the wall thickness of the housing with the at least one expansion inhibitor may be thicker than a thickness of periphery of the at least one expansion inhibitor.

In this configuration, stiffness of the at least one expansion inhibitor is greater than that of the periphery of the at least one expansion inhibitor, which consequently limits expansion of the boundary portion in the outward direction. Accordingly, the activated carbon can be inhibited from falling out from the filling chamber.

In the aforementioned canister, the at least one expansion inhibitor may include at least two ribs.

This configuration can increase the stiffness of the at least one expansion inhibitor, which accordingly inhibits the expansion of the boundary portion in the outward direction. Accordingly, the activated carbon can be inhibited from falling out from the filling chamber.

In the aforementioned canister, the at least two ribs may be placed to interpose the boundary portion.

This configuration inhibits the expansion of the boundary portion, which is the most vulnerable portion of the housing in terms of falling of the activated carbon if expanded. Accordingly, the activated carbon can be inhibited from falling out from the filling chamber.

In the aforementioned canister, the at least one expansion inhibitor may be arranged approximately in parallel with the boundary portion.

This configuration inhibits the expansion of the portion of the housing which is most vulnerable in terms of falling of the activated carbon and which is the most desired target of inhibiting the expansion. Accordingly, the activated carbon can be inhibited from falling out from the filling chamber.

In the aforementioned canister, a length of the at least one expansion inhibitor may be three fourths of an outer perimeter of the housing.

According to this configuration, the activated carbon can be sufficiently inhibited from falling out from the filling chamber.

The aforementioned canister may further include a filter that is moveable inside the housing and configured to allow passage of fuel vapor while limiting passage of the activated carbon. The boundary portion may be positioned at a location where the filter is placed.

According to this configuration, the activated carbon can be inhibited from falling out from a space between the filter and the boundary portion.

In the aforementioned canister, the housing may include two or more sets of the filled portion and the unfilled portion. The at least one expansion inhibitor may be arranged on an outer-circumferential surface of the housing.

According to this configuration, the expansion of the boundary portion in the outward direction can be limited for each of the sets of the filled portion and the unfilled portion. Accordingly, the activated carbon can be inhibited from falling out from the filling chamber.

BRIEF DESCRIPTION OF THE DRAWINGS

Example embodiments of the present disclosure will be described hereinafter with reference to the accompanying drawings, in which.

DETAILED DESCRIPTION OF EXEMPLARY EMBODIMENTS

[1. First Embodiment]
[1-1. Structure]

Figure 1:
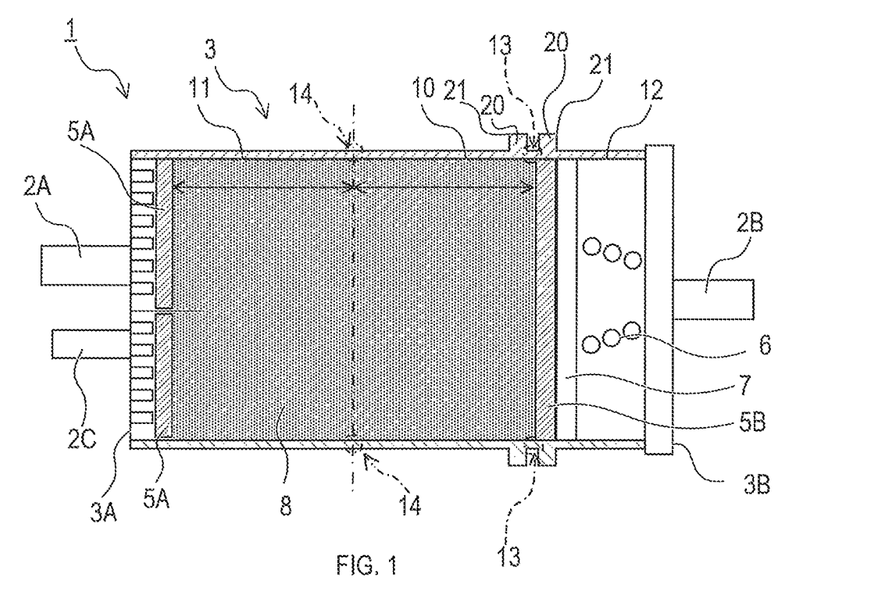
FIG. 1 is a schematic cross-sectional view of a canister of a first embodiment.

The canister 1 shown in FIG. 1 adsorbs and desorbs fuel vapor generated in a fuel tank of a vehicle (illustration omitted). The canister 1 includes a housing 10, and an expansion inhibitor 20.

The housing 10 is in a form of a cylinder that can be filled with activated carbon 8. The housing 10 is a casing made of a synthetic resin. Materials for making the housing 10 however should not be limited to synthetic resins. Hereinafter, a space defined by the housing 10 to fill the activated carbon 8 is also referred to as a filling chamber 3. In the present embodiment, the activated carbon 8 is an aggregate of granules. The shape of the granule in the activated carbon 8 is a relatively minute rock, but should not be limited to a particular shape as long as the shape allows the activated carbon 8 to be filled in the filling chamber 3 while creating gaps. The activated carbon 8 may be formed into an aggregate of pellets.

The housing 10 includes a charge port 2A, an atmosphere port 2B, and a purge port 2C. The charge port 2A is coupled to the fuel tank of the vehicle via a pipe. The charge port 2A is configured to introduce the fuel vapor generated in the fuel tank into the filling chamber 3. The atmosphere port 2B is coupled to a drain filter and the like via a pipe and is open to the atmosphere. The atmosphere port 2B releases gases that is free from the fuel vapor to the atmosphere. The atmosphere port 2B also desorbs the fuel vapor, which is adsorbed in the filling chamber 3, by taking in external air (that is, purging by purge air). The purge port 2C is coupled to an internal combustion chamber (illustration omitted) of an engine of the vehicle via a purge valve. The purge port 2C is configured to release the fuel vapor, stored in the filling chamber 3, from the filling chamber 3 and supply the engine with the released fuel vapor. The atmosphere port 2B is placed at a location opposite the charge port 2A and the purge port 2C across the filling chamber 3. Each port may be arranged differently without being limited to the aforementioned arrangement.

Hereinafter, in the drawings of the present disclosure, the side where the atmosphere port 2B is positioned is "right", and the side where the charge port 2A and the purge port 2C are positioned is "left" when the "center" is in the middle of the housing 10. Right-left directions correspond to an axial direction of the cylinder shape of the housing 10. These definitions of directions are used for the convenience in describing the shape and structure of the canister 1, and should not be used to limit the structure, mode of use, and application of use of the canister 1.

A first wall 3A is situated at a left-end of the housing 10, and a second wall 3B is situated at a right-end of the housing 10. The first wall 3A is coupled to the charge port 2A and the purge port 2C. The second wall 3B is coupled to the atmosphere port 2B.

A first filter 5A is placed on the right side of the first wall 3A. A second filter 5B is placed on the left side of the second wall 3B. The activated carbon 8 is filled in a space between the first filter 5A and the second filter 5B.

Each of the first filter 5A and the second filter 5B is configured not to allow the passage of the activated carbon 8 while allowing passage of the fuel vapor. The second filter 5B is shaped such that its outer edge contacts an inner-circumferential surface of the housing 10, or such that a very small clearance is created between the outer edge of the second filter 5B and the inner-circumferential surface of the housing 10. Between the second filter 5B and the second wall 3B, at least one elastic body 6 and a grid 7 are disposed. The at least one elastic body 6 biases the grid 7 to the left, and accordingly, the second filter 5B is pushed to the left. In other words, the at least one elastic body 6 biases the second filter 5B from an area in the housing 10 where the activated carbon 8 is not filled towards an area in the housing 10 where the activated carbon 8 is filled. One example of the at least one elastic body 6 is a spring. The second filter 5B is moveable in the axial direction of the housing 10. The grid 7 has square-grating pattern that allows the fuel vapor to pass through. The activated carbon 8 receives a pressure force from the second filter 5B, which is pushed by the grid 7 biased by the at least one elastic body 6, and is packed into the filling chamber 3 without leaving any gaps. The second filter 5B follows a movement of a granular surface of the activated carbon 8 which is caused by the granules of the activated carbon 8 grating with each other due to a vibration of the vehicle. By thus applying pressure from the at least one elastic body 6 to the activated carbon 8, it is possible to inhibit creation of gaps in the activated carbon 8 and reduce the movement of the activated carbon 8 caused by the gaps as well as damages to the activated carbon 8 due to such movement. As a consequence, an excessive increase in a ventilation pressure loss and generation of deviated ventilation can be reduced, which then makes it possible to inhibit a functional decline of the canister 1.

The second filter 5B corresponds to the filter of the present disclosure that is moveable inside the housing 10 and configured to allow the passage of the fuel vapor while limiting the passage of the activated carbon 8.

The housing 10 includes a filled portion 11 which is an area in the housing 10 filled with the activated carbon 8, and an unfilled portion 12 which is an area in the housing 10 not filled with the activated carbon 8. In the present embodiment, the filled portion 11 corresponds to an area between the first filter 5A and the second filter 5B; and the unfilled portion 12 corresponds to an area between the second filter 5B and the second wall 3B.

The housing 10 also includes a boundary portion 13 that defines a boundary between the filled portion 11 and the unfilled portion 12; and a center portion 14 which is situated at the axial center of the filled portion 11. The expansion inhibitor 20 inhibits an expansion of the boundary portion 13 in an outward direction from being greater than an expansion of the center portion 14 in the outward direction. The position of the boundary portion 13 corresponds to the position of the granular surface of the activated carbon 8 in the filling chamber 3. The boundary portion 13 is situated in the vicinity of the granular surface of the activated carbon 8 which is adjacent to the left-side surface of the second filter 5B. It can also be said that the position of the boundary portion 13 is the position where the second filter 5B is located. The boundary portion 13 is therefore positioned depending on the shape and a filling amount of the activated carbon 8. In other words, the filling amount of the activated carbon 8 is set so that the granular surface of the activated carbon 8 is situated at the position where the expansion inhibitor 20 is located. The filled portion 11 is, more specifically, an area between the first filter 5A and the second filter 5B in the filling chamber 3. In other words, along the axis of the housing 10, the distance between the center portion 14 and the first filter 5A is equal to the distance between the center portion 14 and the second filter 5B.

In the present embodiment, the two ribs 21 are disposed as the expansion inhibitor 20. The two ribs 21 are separately placed to interpose the boundary portion 13. The two ribs 21 are arranged to entirely surround the housing 10 and arranged approximately in parallel with the boundary portion 13.

Figure 2A:
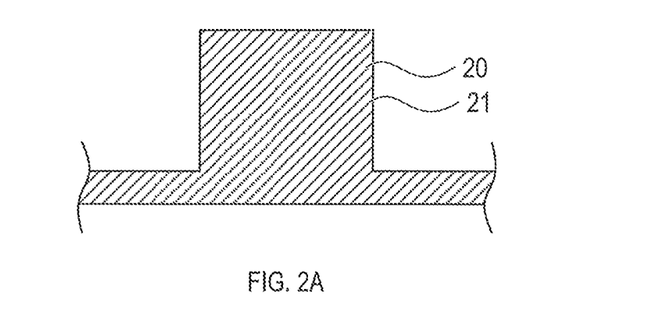
FIG. 2A is a cross-sectional view of a rib having an approximately quadrangular cross section.
Figure 2B:
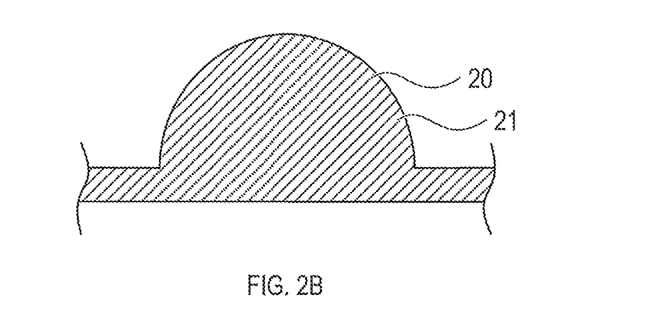
FIG. 2B is a cross-sectional view of a rib having a curved cross section.
Figure 2C:
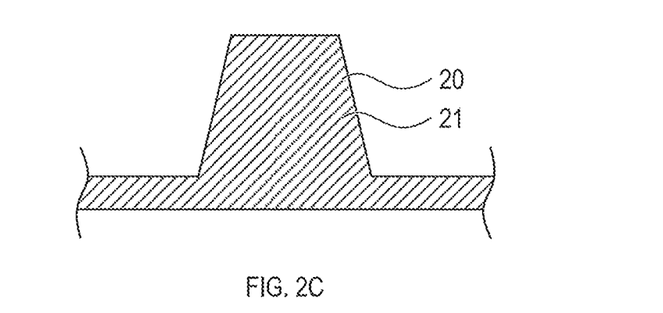
FIG. 2C is a cross-sectional view of a rib having an approximately trapezoidal cross section.

The two ribs 21 is integrally formed with the housing 10. As shown in FIG. 2A, each rib 21 has an approximately quadrangular cross section. The cross sectional shape of the rib 21 is not limited to such approximately quadrangular shape, but may include a curved shape or may be an approximately trapezoidal shape as shown in FIG. 2B and FIG. 2C, or may be any other shapes. The cross section of the rib 21 may change its shape along the outer periphery of the housing 10.

Stiffness of the boundary portion 13 is increased by the two ribs 21 compared to the stiffness of the periphery of the boundary portion 13. Meanwhile, stiffness of the center portion 14 in the filled portion 11 is lower than the boundary portion 13 as the center portion 14 has no rib 21 formed thereon.

[1-2. Effects]

According to the aforementioned embodiment, the following effects can be attained.

(1a) The expansion inhibitor 20 can increase the stiffness of the boundary portion 13; therefore, the expansion of the boundary portion 13 in the outward direction is inhibited. The activated carbon 8 filled in the filling chamber 3 is an aggregate of granules; therefore, the pressure force applied by the at least one elastic body 6 towards the left is also transmitted to circumferential wall surfaces of the housing 10. At this point, the expansion inhibitor 20 serves to inhibit the expansion of the boundary portion 13 in the outward direction while the center portion 14, which has less stiffness than the boundary portion 13, expands before the boundary portion 13. Accordingly, it is less likely to create a gap between the boundary portion 13 and the second filter 5B, which then made it possible to inhibit the activated carbon 8 from falling out from the filling chamber 3.

(1b) The expansion inhibitor 20 includes two or more of the ribs 21. In such a configuration, by adjusting the position of the ribs 21, a target portion to inhibit an expansion can also be adjusted.

(1c) The ribs 21 are arranged to interpose the boundary portion 13. Such a configuration can inhibit an expansion of the boundary portion 13, which is the most vulnerable portion of the housing 10 in terms of falling of the activated carbon 8 if expanded. This configuration accordingly makes it possible to inhibit the activated carbon 8 from falling out from the filling chamber 3.

(1d) The expansion inhibitor 20 is arranged approximately parallel with the boundary portion 13. In other words, the expansion inhibitor 20 is arranged along the boundary portion 13 lengthwise. This inhibits an expansion along the boundary portion 13, which is the most vulnerable portion of the housing in terms of falling of the activated carbon 8 if expanded. This configuration accordingly makes it possible to inhibit the activated carbon 8 from falling out from the filling chamber 3.

(1e) The canister 1 includes the second filter 5B. The second filter 5B is moveable inside the housing 10 and configured to allow the passage of the fuel vapor while limiting the passage of the activated carbon 8. The position of the boundary portion 13 corresponds to the position where the second filter 5B is situated. This configuration makes it possible to inhibit the activated carbon 8 from falling out through a gap between the second filter 5B and the boundary portion 13. The second filter 5B may be configured not to allow the passage of the fuel vapor. In this case, the atmosphere port 2B may be situated at a position where the fuel vapor does not have to pass through the second filter 5B. For example, the atmosphere port 2B may be situated on a circumferential wall surface, which defines the filing chamber 3, as a flow path for the fuel vapor and the atmospheric air.

(1f) The canister 1 includes the at least one elastic body 6 configured to bias the second filter 5B from the unfilled portion 12 towards the filled portion 11. This configuration enables reduction of gaps in the activated carbon 8. In addition, by being biased by the at least one elastic body 6, generation of a gap between the second filter 5B and the boundary portion 13 can be inhibited. The at least one elastic body 6 does not have to be a spring. The canister 1 does not have to include the at least one elastic body 6.

[2. Other Embodiments]

The embodiment of the present disclosure has been explained above. Nevertheless, the present disclosure can be carried out in various modifications without being limited to the aforementioned embodiments.

Figure 3:
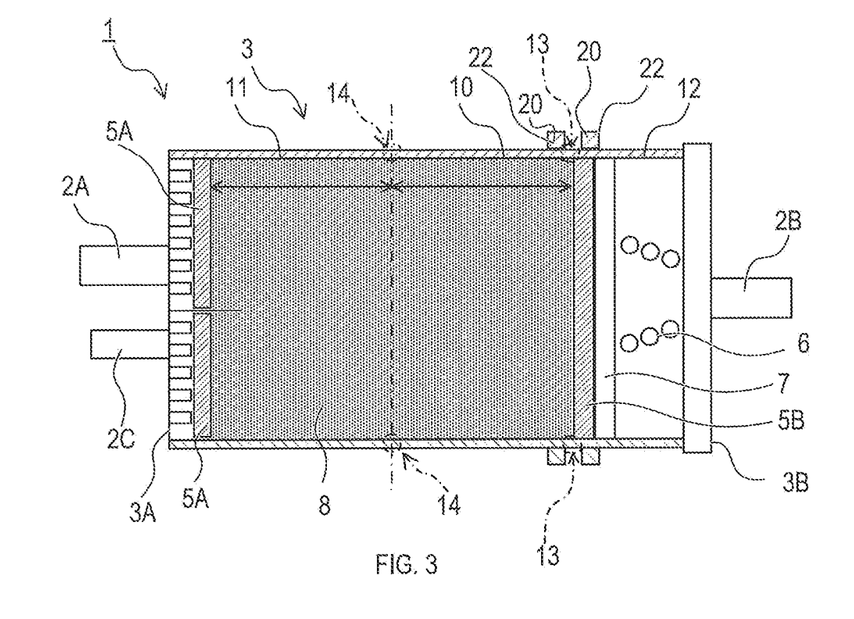
FIG. 3 is schematic cross-sectional view of a canister of a modified example in which a reinforcement member is used as an expansion inhibitor.

(2a) In the aforementioned embodiment, an example of the expansion inhibitor 20 is the ribs 21 which are integrally formed with the housing 10. Nevertheless, the expansion inhibitor 20 does not have to be formed integrally with the housing 10. For example, as shown in FIG. 3, a reinforcement member 22, which can be attached to an outer-circumferential surface of the housing 10 after installation, may be used as the expansion inhibitor 20. At least two reinforcement members 22 may be attached to entirely surround a circumferential area of the outer circumference of the housing 10 or to partially surround a circumferential area of the outer circumference of the housing 10.

(2b) In the aforementioned embodiment, the two ribs 21 are used as the expansion inhibitor 20. Nevertheless, the expansion inhibitor 20 should not be limited to the aforementioned embodiment. For example, a single rib 21 may be used as the expansion inhibitor 20, or three or more ribs 21 may be used as the expansion inhibitor 20.

Figure 4:
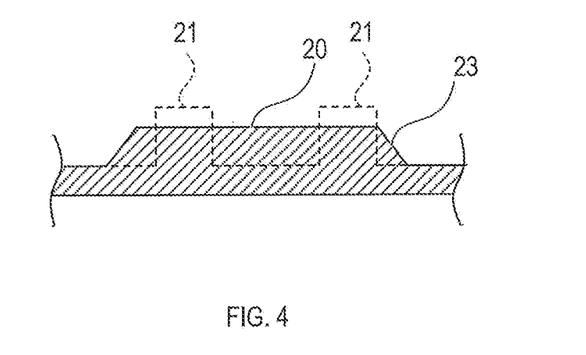
FIG. 4 is a cross-sectional view of the expansion inhibitor of the modified example showing that a thickness of the expansion inhibitor is greater than that of its periphery.

In addition, the rib or ribs 21 do not have to be used as the expansion inhibitor 20. For example, as shown in FIG. 4, in place of the ribs 21, a thick portion 23 may be integrally formed on the housing 10 as the expansion inhibitor 20. The thick portion 23 makes the corresponding portion of the housing 10 thicker than the periphery of the expansion inhibitor 20. The thick portion 23 rises more gradually from the outer-circumferential surface of the housing 10 than the ribs 21 do and may be shorter in height than the ribs 21. The thick portions 23 may be wider than the ribs 21 in the right-left directions. According to this configuration, by making the stiffness of the area where the expansion inhibitor 20 is situated greater than that of the periphery of the expansion inhibitor 20, the expansion of the boundary portion 13 in the outward direction is limited. This can consequently inhibit the activated carbon 8 from falling out from the filling chamber 3.

Figure 5:
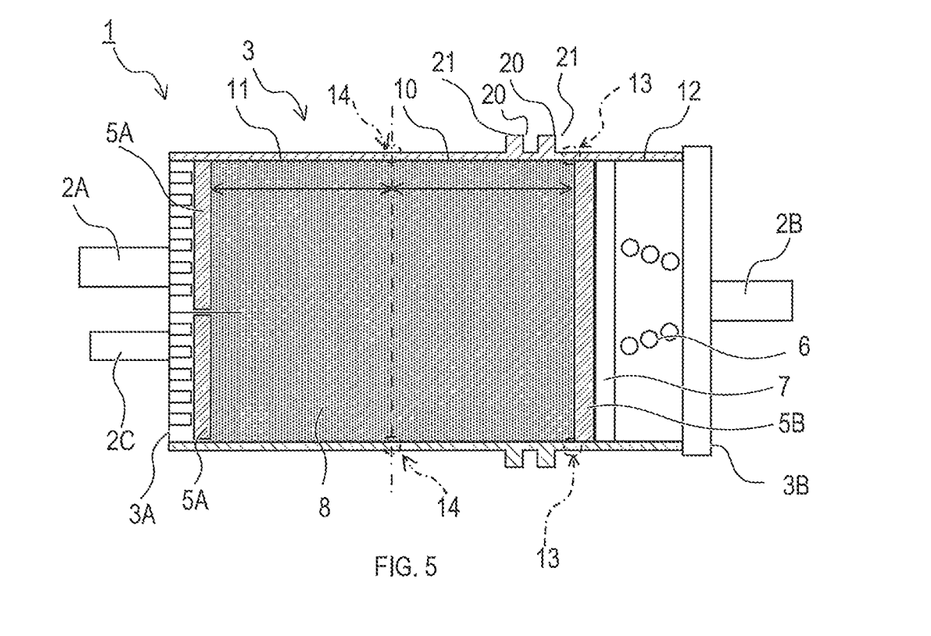
FIG. 5 is a schematic cross-sectional view of a canister of another modified example in which an expansion inhibitor is placed only on a filled portion.
Figure 6:
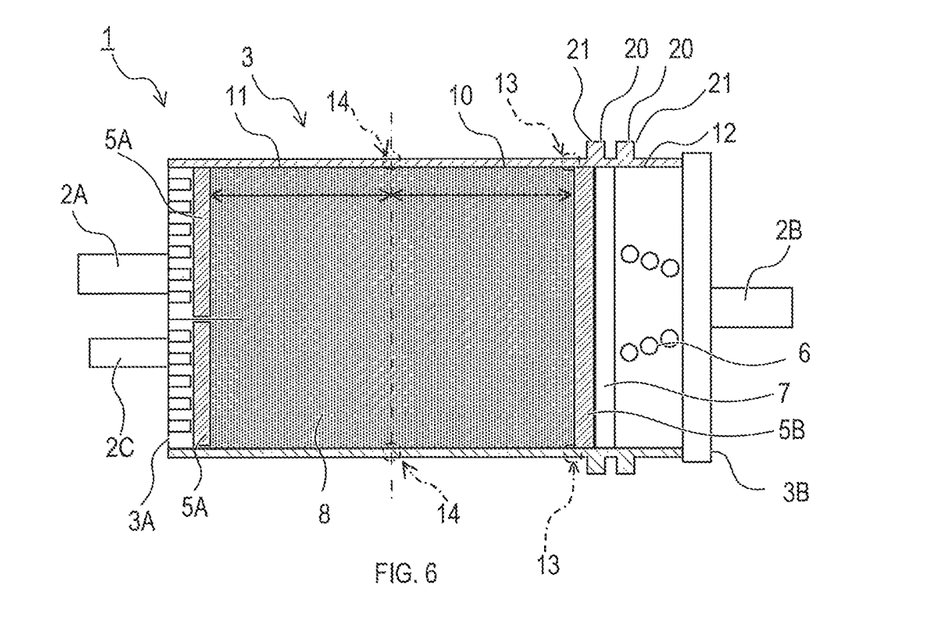
FIG. 6 is a schematic cross-sectional view of a canister of yet another modified example in which the expansion inhibitor is placed only on an unfilled portion.

(2c) In the aforementioned embodiment, the ribs 21 are arranged to interpose the boundary portion 13. Nevertheless, arrangement of the ribs 21 should not be limited to the aforementioned embodiment. For example, as shown in FIG. 5, the ribs 21 may be arranged only on the filled portion 11 near the boundary portion 13; or, as shown in FIG. 6, the ribs 21 may be arranged only on the unfilled portion 12 near the boundary portion 13.

(2d) In the aforementioned embodiment, the ribs 21 are arranged approximately in parallel with the boundary portion 13. Nevertheless, the orientation of the ribs 21 is not limited to the aforementioned embodiment. For example, the ribs 21 may be arranged near the boundary portion 13 and to be orthogonal to the boundary portion 13, in other words, so as to align the length of the ribs 21 along the length of the housing 10.

Figure 7:
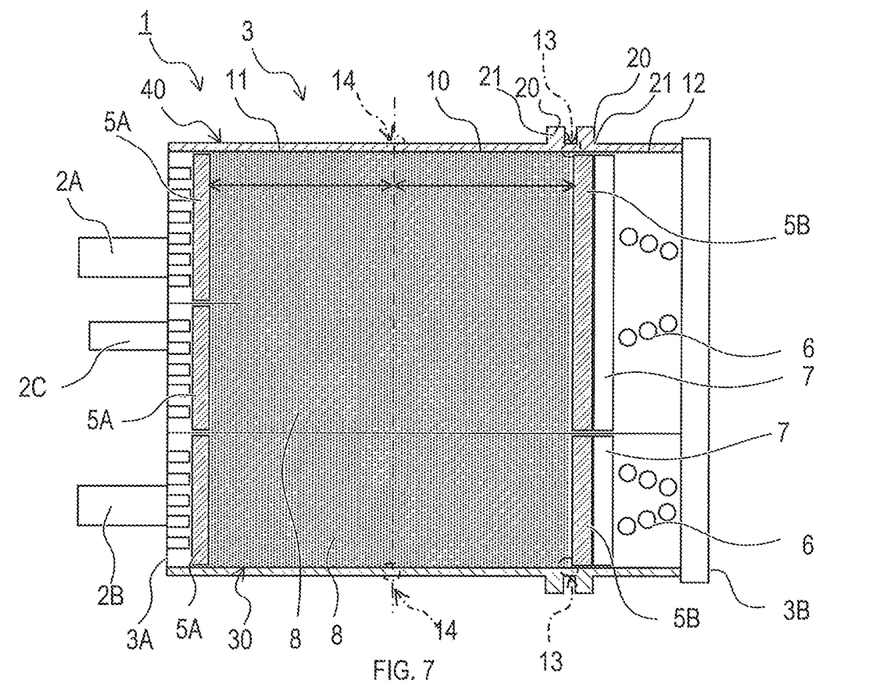
FIG. 7 is a schematic cross-sectional view of a canister of yet another modified example in which the canister includes a sub chamber.

(2e) As shown in FIG. 7, the canister 1 may include a sub chamber 30. In other words, the housing 10 may include two or more group of the filled portion 11 and the unfilled portion 12. The group here means a set of one filled portion 11 and one unfilled portion 12. The sub chamber 30 is also configured to adsorb and desorb the fuel vapor generated in the fuel tank of the vehicle. The sub chamber 30 includes the atmosphere port 2B. The chamber coupled to the charge port 2A and the purge port 2C is referred to as a main chamber 40. When the fuel vapor enters the main chamber 40 from the charge port 2A, the entered fuel vapor makes a turn in a space between the second filter 5B and the second wall 3B so as to move reversely to enter the sub chamber 30. Accordingly, the flow path of the fuel vapor in the canister 1 that includes the sub chamber 30 is approximately U-shaped. The expansion inhibitor 20 may be arranged entirely around a circumferential area of the outer periphery of the housing including the sub chamber 30. The granular surface of the activated carbon 8 filled in the main chamber 40 and the granular surface of the activated carbon 8 filled in the sub chamber 30 may be located differently. In such a case, for example, the ribs 21 as the expansion inhibitor 20 may be positioned differently on the main chamber 40 and on the sub chamber 30. The housing 10 may also include three or more set of the filled portion 11 and the unfilled portion 12.

Figure 8:
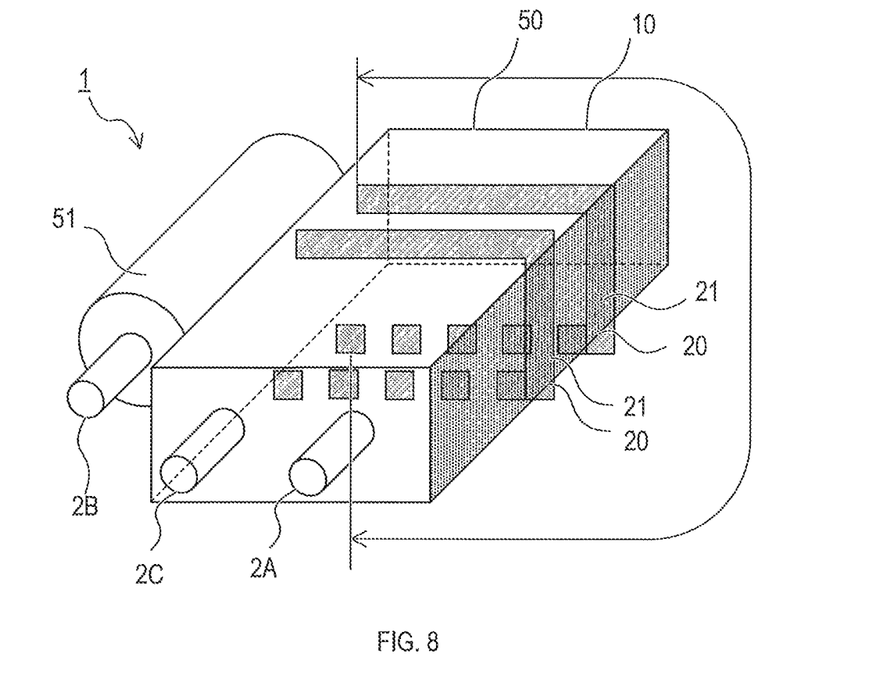
FIG. 8 is a schematic perspective view of the canister of the modified example where the canister includes the sub chamber, in which the expansion inhibitor is arranged on an outer-circumferential surface of the canister such that the length of the expansion inhibitor is about three fourths of a perimeter of the canister at the same cross-section.

(2f) In the aforementioned embodiment, the ribs 21 are arranged to entirely surround a circumferential area of the outer periphery of the housing 10. Nevertheless, the length of the ribs 21 should not be limited to the aforementioned embodiment. For example, as shown in FIG. 5, the ribs 21 may be arranged to partially, instead of entirely, surround a circumferential area of the outer periphery of the housing 10, for example, three fourths of the circumferential area of the outer periphery of the housing 10. In such a configuration, it is possible to sufficiently inhibit the activated carbon 8 from falling out from the filling chamber 3. As shown in FIG. 8, the canister 1 includes a main chamber 50 and a sub chamber 51. The main chamber 50 is formed in an approximately rectangular parallelepiped shape. The sub chamber 51 is formed in a tubular shape with a cross-sectional area smaller than that of the main chamber 50. In such a canister 1, the sub chamber 30 has high stiffness and is less likely to be expanded. Therefore, the activated carbon 8 is still less likely to fall out from the filling chamber 3 without the expansion inhibitor 20.

(2g) Functions of one element in the aforementioned embodiments may be achieved by two or more elements. Functions of two or more elements may be integrated into one element. A part of the configuration in the aforementioned embodiments may be omitted. At least a part of the configuration in the aforementioned embodiments may be added to or replaced with other part of the configuration in the aforementioned embodiments.

What is claimed is:

1. A canister that adsorbs and desorbs fuel vapor generated in a fuel tank of a vehicle, the canister comprising:
   a housing in a form of a cylinder configured to be filled with activated carbon; and
   at least one expansion inhibitor,
   wherein the housing includes a filled portion which is an area in the housing filled with the activated carbon; an unfilled portion which is an area in the housing not filled with the activated carbon; a boundary portion that defines a boundary between the filled portion and the unfilled portion; and a center portion which is situated at the axial center of the filled portion, and
   wherein the at least one expansion inhibitor is configured to inhibit an expansion of the boundary portion in an outward direction from being greater than an expansion of the center portion in the outward direction.

2. The canister according to claim 1,
   wherein the at least one expansion inhibitor is formed on the housing, and
   wherein a wall thickness of the housing at the at least one expansion inhibitor is thicker than a thickness of periphery of the at least one expansion inhibitor.

3. The canister according to claim 1,
   wherein the at least one expansion inhibitor includes at least two ribs.

4. The canister according to claim 3,
   wherein the at least two ribs are placed to interpose the boundary portion.

5. The canister according to claim 1,
   wherein the at least one expansion inhibitor is arranged approximately in parallel with the boundary portion.

6. The canister according to claim 1,
   wherein a length of the at least one expansion inhibitor is three fourths or more of an outer perimeter of the housing.

7. The canister according to claim 1, further comprising a filter that is moveable inside the housing and configured to allow passage of fuel vapor while limiting passage of the activated carbon,
   wherein the boundary portion is positioned at a location where the filter is placed.

8. The canister according to claim 1,
   wherein the housing includes two or more sets of the filled portion and the unfilled portion, and wherein the at least one expansion inhibitor is arranged on an outer-circumferential surface of the housing.

\* \* \* \* \*